United States Patent [19]

Yamazaki

[11] Patent Number: 4,643,530
[45] Date of Patent: Feb. 17, 1987

[54] REFLECTIVE, THIN FILM TRANSISTOR ADDRESSED, MATRIX LIQUID CRYSTAL DISPLAY

[75] Inventor: Tsuneo Yamazaki, Tokyo, Japan

[73] Assignee: Kabushiki Kaisha Daini Seikosha, Tokyo, Japan

[21] Appl. No.: 497,883

[22] Filed: May 25, 1983

[30] Foreign Application Priority Data

May 26, 1982 [JP] Japan .................................. 57-89303

[51] Int. Cl.[4] ............................................. G02F 1/135
[52] U.S. Cl. ................................ 350/339 R; 350/337; 350/338
[58] Field of Search .................... 350/333, 334, 339 R, 350/337, 338, 341

[56] References Cited

U.S. PATENT DOCUMENTS

| | | | |
|---|---|---|---|
| 3,912,366 | 10/1975 | Sprokel | 350/338 X |
| 3,941,901 | 3/1976 | Harsch | 350/341 X |
| 3,967,253 | 6/1976 | Tsuruishi | 350/334 X |
| 4,217,160 | 8/1980 | Perregaux | 350/337 X |
| 4,386,352 | 5/1983 | Nonomura et al. | 350/333 X |
| 4,431,271 | 2/1984 | Okubo | 350/334 |

FOREIGN PATENT DOCUMENTS 0083025 6/1980 Japan .............................. 350/339 R Primary Examiner—John K. Corbin
Assistant Examiner—David Lewis
Attorney, Agent, or Firm—Robert E. Burns; Emmanuel J. Lobato; Bruce L. Adams

[57] ABSTRACT

A matrix liquid crystal display device comprising a reflecting plate and a polarizing plate coated on an insulating substrate, a thin film transistor arranged on the insulating substrate in matrix configuration, and a liquid crystal sandwiched between the insulating substrate and a glass plate. A cross-talk between picture elements caused by transmission or reflection of light on the substrate is prevented. The thin film transistor is formed by a semiconductor film made of amorphous silicon or a gate insulating film made of silicon dioxide which is easily formed at low temperature under 40° C. by plasma CVD method or the like.

19 Claims, 2 Drawing Figures

REFLECTIVE, THIN FILM TRANSISTOR ADDRESSED, MATRIX LIQUID CRYSTAL DISPLAY

BACKGROUND OF THE INVENTION

The present invention relates to a matrix liquid crystal display device comprising a liquid crystal and thin film transistor arrays.

FIG. 1 shows a sectional view of a conventional matrix liquid crystal display device comprising thin film transistor arrays. Insulating gate electric field effect transistors comprising a source electrode 2, a drain electrode 3, a semiconductor thin film 4, a gate insulating film 5 and a gate electrode 6, and condensers comprising transparent electro-conductive electrodes 7, 8 and an insulating film 9 are arranged in a matrix configuration on one major surface of a glass substrate 1 of more than 200μ thick. A polarizing plate 10 and a reflecting plate 11 are deposited on the other major surface of the glass substrate 1. A transparent electro-conductive film 13 is coated on one major surface of a glass plate 12 and a polarizing plate 14 is coated on the other major surface of the same. A liquid crystal layer 15 is sandwiched between the glass plate 12 and the glass substrate 1.

The semiconductor film 4 comprises an amorphous silicon formed by the plasma CVD method or a polycrystalline silicon formed by the CVD method. The gate electrode 6, the source electrode 2 and the drain electrode 3 are made of metal such as aluminum, molybdenum, etc. or P type- or N-type semiconductor film formed by doping. The gate insulating film 5 and the insulating film 9 are made of silicon dioxide, silicon nitride, etc. formed by sputtering or the plasma CVD method. The transparent electrodes 7, 8 and 13 are made of ITO (indium-tin-oxide film) or the like.

The operation of the conventional matrix liquid crystal display device will be illustrated.

When a voltage is applied to the gate electrode 6, a signal voltage applied to the source electrode 2 of the transistor which is in the ON state is stored in the condenser comprising the electrodes 7, 8 and the insulating film 9, and held therein even after the transistor is switched to the OFF state, whereby the voltage is applied to the liquid crystal layer 15 in the region sandwiched between the transparent electrodes 13 and 7. By way of example, the operation of a twisted-nematic electric field effect liquid crystal will be illustrated. The part of the liquid crystal to which no electric field is applied is oriented so as to be parallel to the surface of the substrate. The direction of orientation differs by 90° between the region near the surface of the glass plate 12 and the region near the surface of the glass substrate 1, whereby the orientation in the liquid crystal layer is twisted in the range of 0°–90°. The liquid crystal is oriented in the vertical direction relative to the substrate 1 by application of an electric field.

A light incident upon a portion of the liquid crystal layer to which no voltage is applied is polarized by the polarizing plate 14. The direction of polarization turns at 90° in the liquid crystal layer, and the light is transmitted to the polarizing plate 10 which settles the direction of polarization perpendicularly to the deflecting plate 14. The polarized light is then transmitted back through the liquid crystal layer similarly to the case of incidence after being reflected by the reflecting plate, and then transmitted through the polarizing plate 14. A light incident upon a portion of the liquid crystal layer to which an electric field is applied is not turned in the direction of deflection and is absorbed by the polarizing plate 10. Since the degree of light absorption can be controlled by the application of voltage, the function as a display device is practicable. A signal voltage stored in the condenser is held even after the transistor is turned OFF whereby a matrix display device of extremely high density without cross-talk is obtained.

The conventional matrix liquid-crystal display device, however, has the following drawback.

The thickness of the glass substrate 1 is generally more than 200 μm so as to keep the mechanical strength and to decide the thickness of the liquid crystal layer with high accuracy. The dimension of a unit picture element is decided by the display area and display density of the overall display panel. When the dimension of a display panel is 10×10 cm and the number of picture elements is 250×250, the dimension of a unit picture element is 400 μm. On the other hand, the thickness of the glass substrate should be around 500 μm for the display panel of the above dimension. Accordingly, an oblique light incident upon the display device shifts positionally while it traverses through the glass 1, and exits through a picture element different from the incident one, whereby a primary modulation cannot be effected on the light. As a result, a picture displayed by the display device is indistinct.

BRIEF SUMMARY OF THE INVENTION

Accordingly, it is an object of the resent invention to provide a matrix display device with an improved resolving power of the picture elements without crosstalk of the picture elements due to an oblique incident light by providing a reflecting metal film and a polarizing film on the innermost surface of a substrate.

DESCRIPTION OF THE PREFERRED EMBODIMENT

Figure 1:
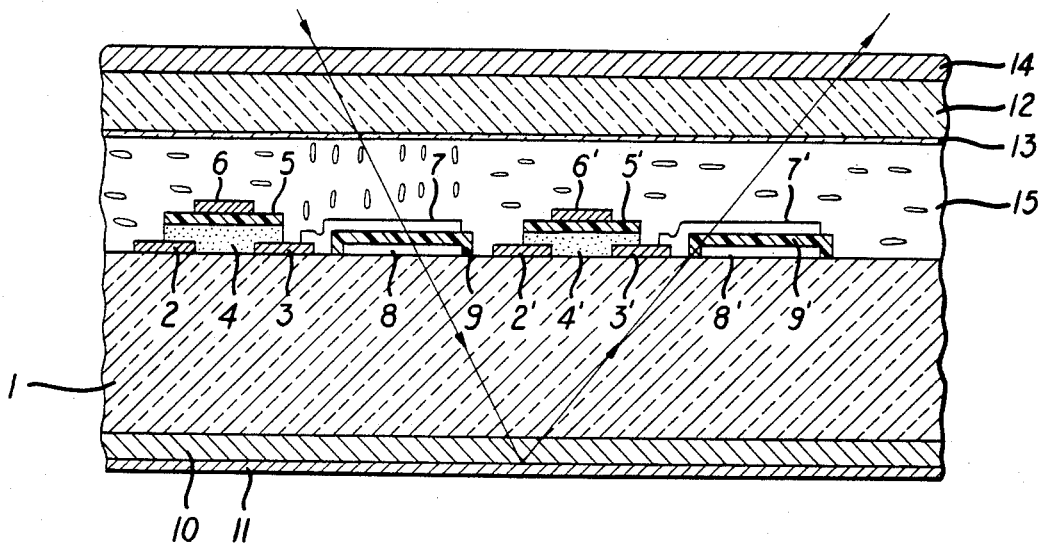
FIG. 1 is a sectional view of a conventional matrix liquid crystal display device.
Figure 2:
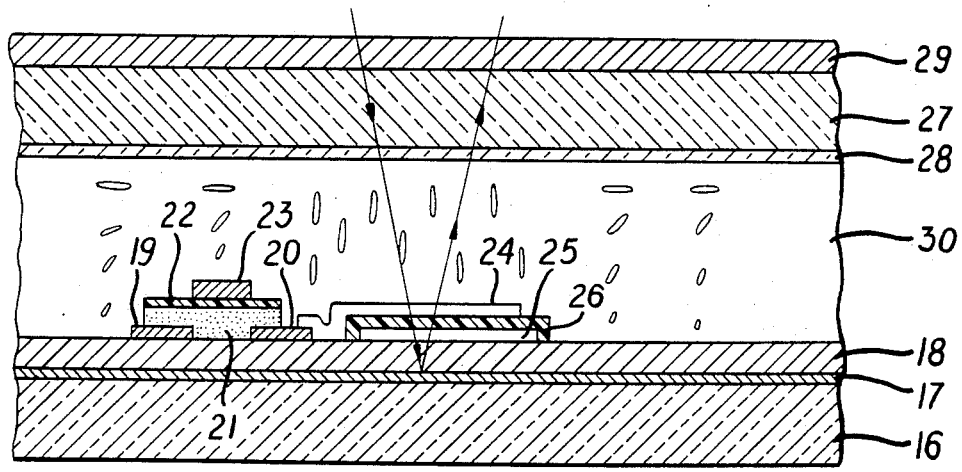
FIG. 2 is a sectional view showing an embodiment of a matrix liquid crystal display device according to the present invention.

FIG. 2 is an embodiment of the present invention showing a sectional view of a unit picture element portion of a matrix liquid crystal display device comprising thin film transistors arranged in an array configuration. A reflecting metal film 17 and a polarizing film 18 are coated on one major surface of a substrate 16 made of glass or metal. Insulating gate electric field effect transistors comprising a source electrode 19, a drain electrode 20, a semiconductor film 21, a gate insulating film 22 and a gate electrode 23, and liquid crystal driving elements comprising transparent electro-conductive electrodes 24, 25 and an insulating film 26 are arranged on the polarizing film 18 in a matrix configuration. A transparent electro-conductive film 28 is coated on one major surface of a glass plate 27 and a polarizing plate 29 is coated on the other major surface of the same. A liquid crystal layer 30 is sandwiched between the substrate 16 and the glass plate 27.

The semiconductor film 21 comprises an amorphous silicon formed by the plasma CVD method or a polycrystalloid silicon formed by the CVD method. The gate insulating film 22 and the insulating film 25 are made of silicon dioxide, silicon nitride, etc. formed by sputtering or the plasma CVD method. The transparent electrodes 24, 25 and 28 are made of ITO or the like. The reflecting metal film 17 is an aluminum film formed by evaporation, or the substrate 16 maybe made of metal whose surface serves as a reflecting plate. The polarizing film 18 is made of what is called a glass polarizing plate (metal powders oriented in a glass) or a film on which a plastic polarizing plate is adhered. By forming a thin film which makes up the transistors using low-temperature processing under 400° C., such as by the plasma CVD method and evaporation, the polarizing film 18 is formed without deterioration of its polarizing characteristic. Since an oblique light incident upon the display device traverses only the polarizing film 18, which is less than 10 μm thick in this embodiment, a positional shift of the incident light is almost negligible, and both the incident light and the reflected light pass the same picture element.

As illustrated, a matrix liquid crystal display device without cross-talk of picture elements caused by positional shift of incident light is realized by providing a reflecting metal film and a polarizing film on the innermost surface of a substrate.

What is claimed is:

1. A matrix liquid crystal display device comprising: a reflecting layer formed on a substrate; a first polarizing layer formed on said reflecting layer, said reflecting layer being sandwiched between said first polarizing layer and said substrate; thin film transistors and condensers arranged on said first polarizing layer in a two-dimensional matrix configuration, said first polarizing layer being sandwiched between said reflecting layer and said matrix configuration of thin film transistors and condensers; a transparent plate having opposed major surfaces and being spaced from the matrix configuration of thin film transistors and condensers; a transparent electrode formed on the major surface of said transparent plate which faces said first polarizing layer; a liquid crystal layer sandwiched between said first polarizing layer and said transparent electrode; and a second polarizing layer disposed on the same side of the liquid crystal layer as said transparent plate.

2. A matrix liquis crystal display device as claimed in claim 1; wherein said liquid crystal comprises an electric field effect twisted nematic type liquid crystal.

3. A matrix liquid crystal display device as claimed in claim 1; wherein each thin film transistor comprises an insulating gate type field effect transistor composed of amorphous silicon.

4. A matrix liquid crystal display device as claimed in claim 1; wherein each thin film transistor comprises an insulating gate type field effect transistor composed of polycrystalline silicon.

5. A matrix liquid crystal display device as claimed in claim 1; wherein said substrate comprises a glass plate.

6. A matrix liquid crystal display device as claimed in claim 4; wherein said reflecting layer comprises a metal plate having a reflecting inner surface.

7. A matrix liquid crystal display device as claimed in claim 4; wherein said reflecting layer comprises a metal film.

8. In a matrix liquid crystal display device: means defining a light-reflecting surface; a first polarizing layer formed on the light-reflecting surface; an array of thin film transistors and driving elements arranged in a two-dimensional matrix on the first polarizing layer, the first polarizing layer being sandwiched between the light-reflecting surface and the array of thin film transistors and driving elements, each driving element corresponding to one thin film transistor and having a first transparent electrode; a transparent plate having opposed major surfaces and being spaced-apart from the array of thin film transistors and driving elements; a second transparent electrode formed on the major surface of the transparent plate which faces the first polarizing layer; a liquid crystal material interposed between the first and second transparent electrodes; and a second polarizing layer disposed on the same side of the liquid crystal material as the transparent plate.

9. A matrix liquid crystal display device according to claim 8; wherein the liquid crystal material comprises an electric field effect twisted nematic type liquid crystal.

10. A matrix liquid crystal display device according to claim 8; wherein the liquid crystal material comprises a guest-host type liquid crystal.

11. A matrix liquid crystal display device according to claim 8; wherein the first polarizing layer has a thickness no greater than 10 μm.

12. A matrix liquid crystal display device according to claim 11; including a substrate having an inner major surface on which is formed the light-reflecting surface.

13. A matrix liquid crystal display device according to claim 9; wherein the substrate comprises a glass plate.

14. A matrix liquid crystal display device according to claim 12; wherein the substrate comprises a metal plate, and the means defining a light-reflecting surface comprises a light-reflecting major surface of the metal plate.

15. A matrix liquid crystal display device according to claim 8; including a substrate having a major surface on which is formed the light-reflecting surface.

16. A matrix liquid crystal display device according to claim 15; wherein the substrate comprises a glass plate.

17. A matrix liquid crystal display device according to claim 15; wherein the substrate comprises a metal plate, and the means defining a light-reflecting surface comprises a light-reflecting major surface of the metal plate.

18. A matrix liquid crystal display device according to claim 8; wherein each thin film transistor comprises an insulating gate type field effect transistor composed of amorphous silicon.

19. A matrix liquid crystal display device according to claim 8; wherein each thin film transistor comprises an insulating gate type field effect transistor composed of polycrystalline silicon.

* * * * *